United States Patent [19]

Melocik et al.

[11] Patent Number: 4,508,999

[45] Date of Patent: Apr. 2, 1985

[54] SHORT CIRCUIT PROTECTION APPARATUS

[75] Inventors: Grant C. Melocik, Chardon; William Pickering, University Heights, both of Ohio

[73] Assignee: Towmotor Corporation, Mentor, Ohio

[21] Appl. No.: 455,723

[22] Filed: Jan. 5, 1983

[51] Int. Cl.³ .............................................. G05B 5/00
[52] U.S. Cl. .................................. 318/331; 318/333; 318/345 B; 318/345 F
[58] Field of Search .................... 318/331, 333, 345 B, 318/345 F; 361/18, 63, 88, 90, 91, 92, 93, 1, 23, 67, 102, 89, 94, 95

[56] References Cited

U.S. PATENT DOCUMENTS

| | | | |
|---|---|---|---|
| 3,334,272 | 8/1967 | Lipnitz | 361/95 X |
| 3,611,043 | 10/1971 | Steen | 361/102 |
| 4,423,362 | 12/1983 | Konrad et al. | 318/139 |

OTHER PUBLICATIONS

I. Gottlieb, "Switching Regulators & Power Supplies," Tab. Books Inc., Blue Ridge Summit, Pa., 1976; pp. 11-15.

*Primary Examiner*—Ulysses Weldon
*Attorney, Agent, or Firm*—Terry D. Morgan

[57] ABSTRACT

An apparatus (10) for controlling the supply of power from a power source (12) to a motor (14,14'). The apparatus (10) has a controllable switch (20,20') for coupling power to the motor (14,14') responsive to a pulse train, a circuit (22,22') for converting the voltage applied to the motor (14,14') to a logic signal, a line contactor (26) for connecting and disconnecting the power source (12) to and from the motor (14,14'), and a microprocessor (60) for generating the pulse train and controlling the line contactor (26) to disconnect and connect the power source (12) from and to the motor (14,14') in response to the presence and absence of the logic signal, respectively. By sensing short circuits and discontinuing the supply of power in response to the short circuit, a runaway motor speed condition can be avoided, and by using a microprocessor, the present invention is highly reliable, fast, durable, and cost-effective.

12 Claims, 5 Drawing Figures

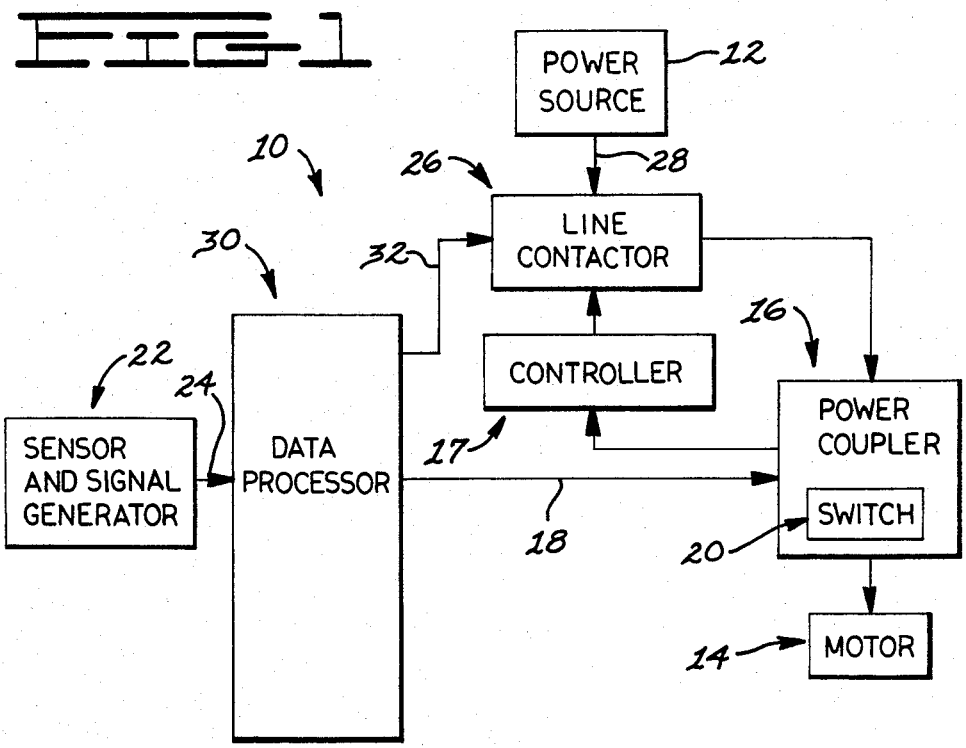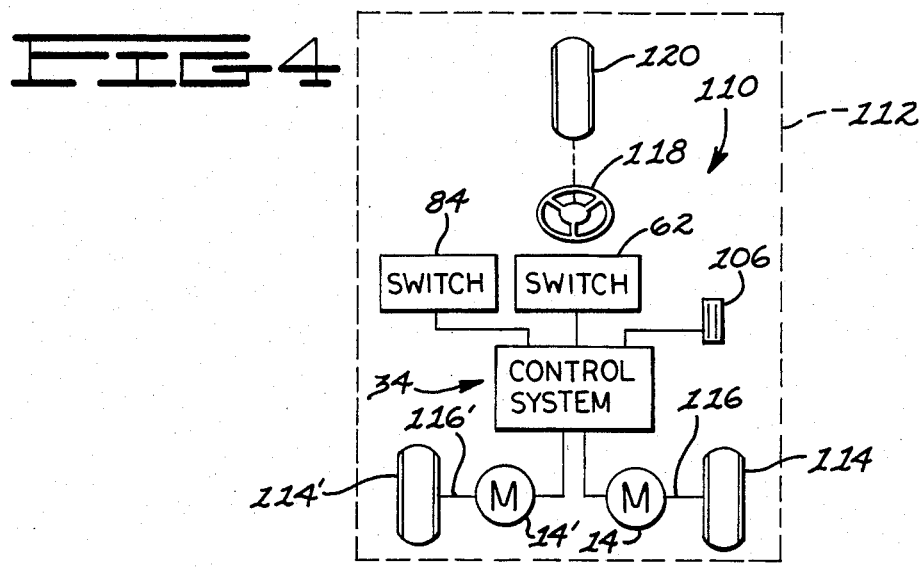

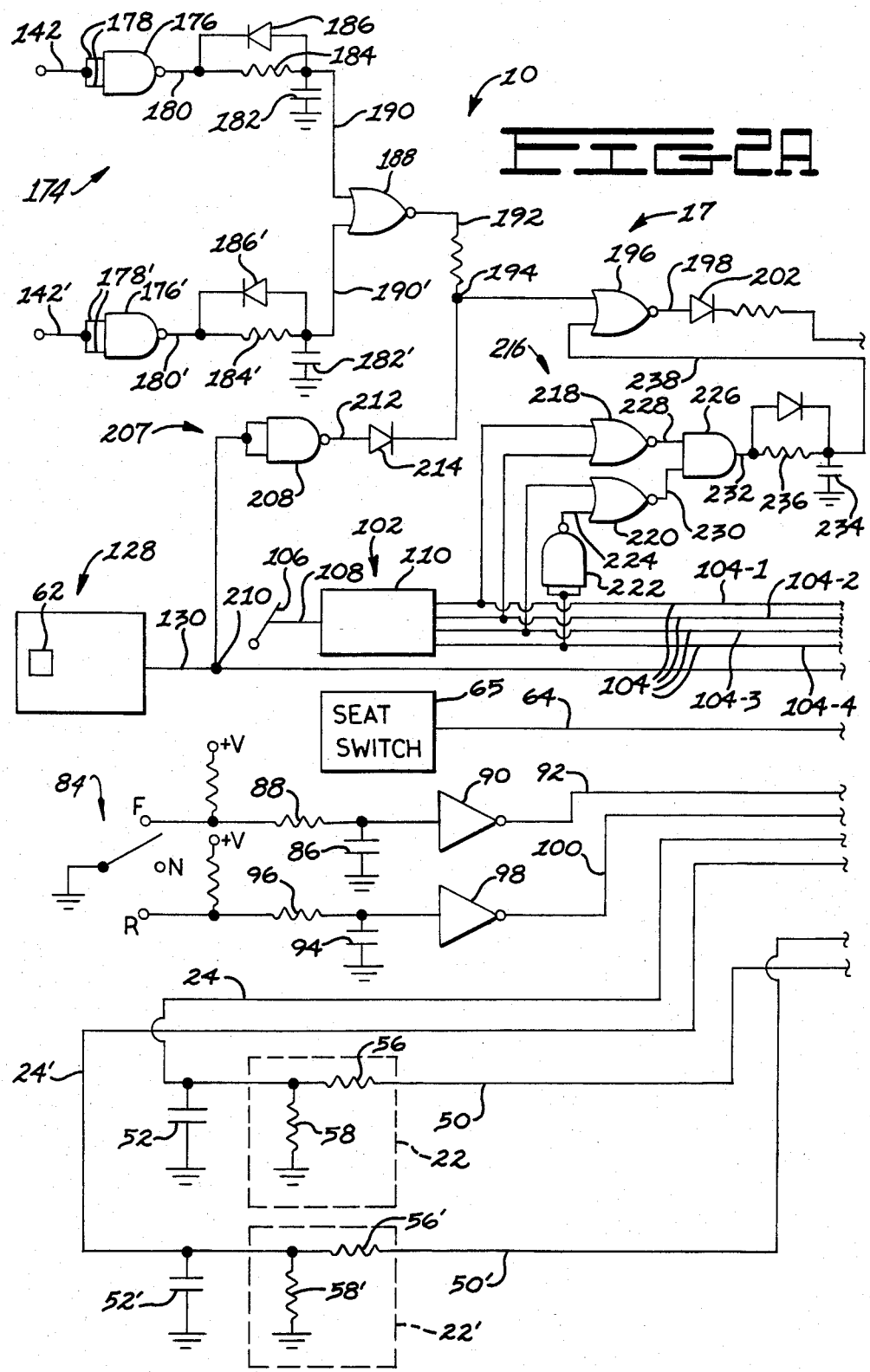

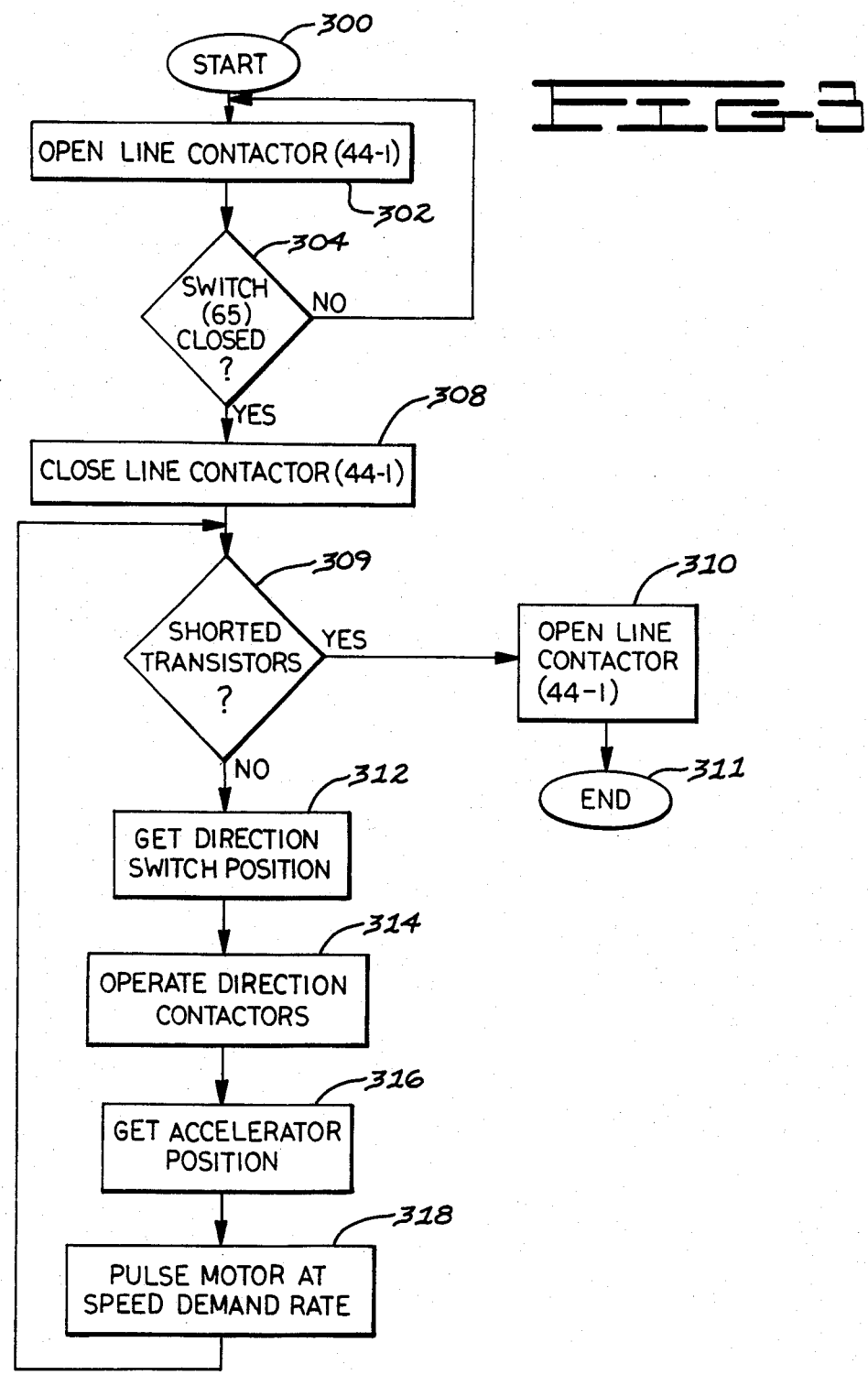

SHORT CIRCUIT PROTECTION APPARATUS

DESCRIPTION

1. Technical Field

The present invention relates generally to a protection device for an electric motor control and, more particularly, to an apparatus for detecting a short circuit failure of a system component.

2. Background Art

A wide variety of systems have control circuits for controlling the supply of power to a device such as a drive motor which drives an electric vehicle. Typically, each control circuit has many components that can fail for any number of reasons, resulting in potential damage to other circuit components, to the overall control circuit, and to the controlled device, as well as other harmful effects. For example, a power switching component such as a power transistor can fail short-circuit, causing excessive power to be supplied to the drive motor. In addition to damaging the drive motor and other components, the excessive power supplied to the drive motor can cause loss of vehicle speed control.

Most of the known control circuits employ some form of protection mode in the event a component fails short-circuit. Obviously, such a protection mode must be highly reliable, fast and durable, as well as being cost-effective. A problem with the known protection modes is that they are designed and employ protection components based on out-dated technology that do not maximize the combined features of high reliability, speed of operation, durability and cost-effectiveness.

The present invention is directed to over-coming one or more of the problems as set forth above.

DISCLOSURE OF THE INVENTION

In one aspect, the present invention includes an apparatus for controlling the speed of an electric motor. The apparatus has a power source, means for producing a variable frequency and variable duty cycle pulse train, controllable means for connecting and disconnecting the motor to and from the power source in response to the pulse train, converting means for producing a logic signal in response to a voltage being applied to the motor, programmable data processing means for monitoring the logic signal and producing a second logic signal in response to the first logic signal being greater than a preselected high logic level, and switching means for disconnecting the motor from the power supply in response to receiving the second logic signal.

Known protection modes for short-circuit conditions are based on out-dated design and discrete component technology. The present invention, embodying integrated circuit technology, is highly reliable, fast, durable, and cost-effective.

BRIEF DESCRIPTION OF THE DRAWINGS

For a better understanding of the present invention, reference may be had to the accompanying drawings in which:

FIG. 1 is a block diagram of one embodiment of the present invention;

FIG. 2A and 2B are a schematic illustration of an overall motor control system incorporating the present invention;

FIG. 3 is a flowchart used to explain the software of one embodiment of the present invention; and, FIG. 4 is a schematized top view of an electric vehicle incorporating the motor control system of the present invention.

BEST MODE FOR CARRYING OUT THE INVENTION

Figure 2B:
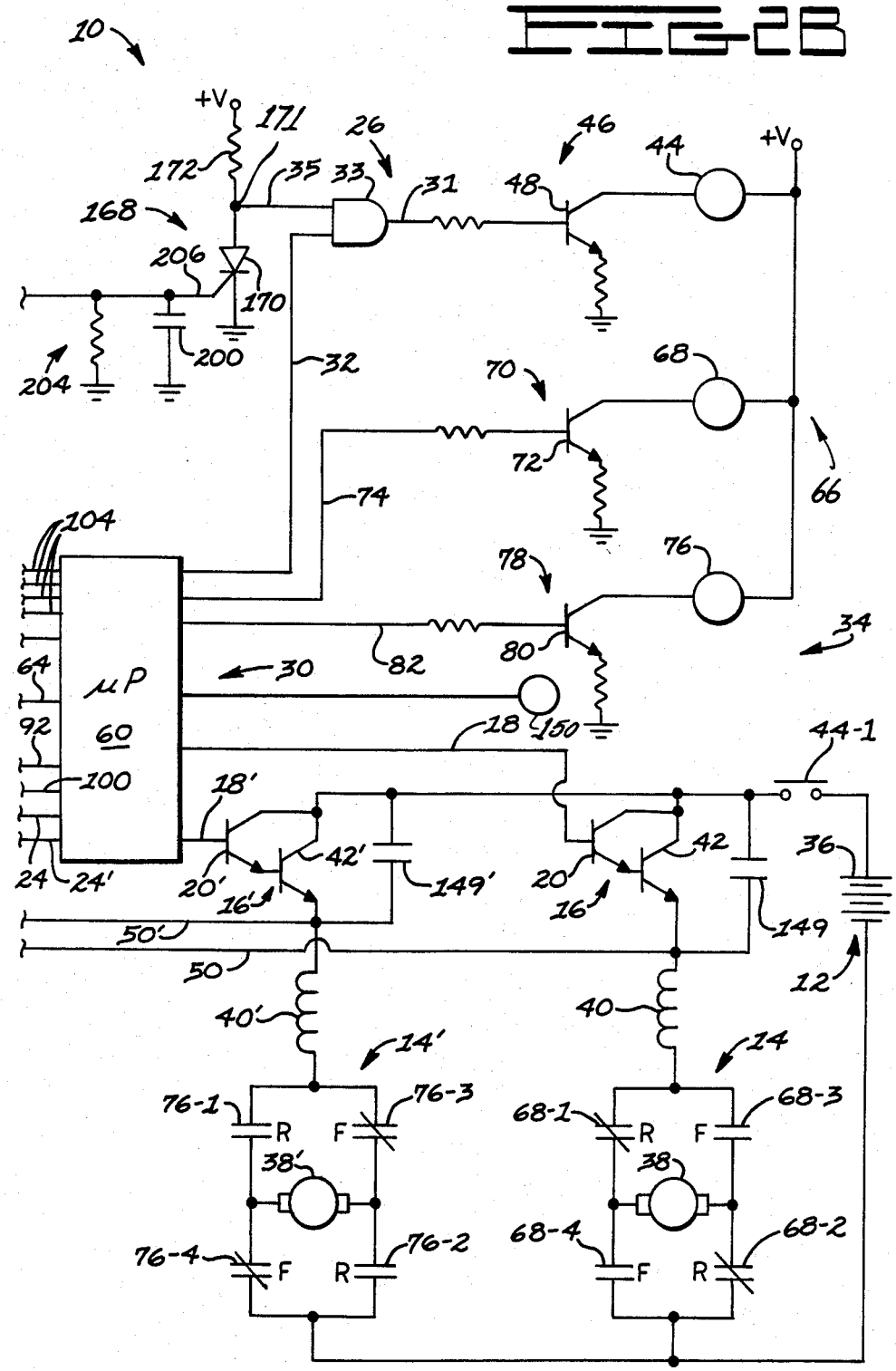

FIG. 1 illustrates an apparatus 10 for controlling the speed of an electric motor 14. The apparatus 10 includes a power source 12, a means 30 for producing a variable frequency and variable duty cycle pulse train, and a controllable means 16 for connecting and disconnecting the motor 14 to and from the power source 12 in response to the pulse train.

The apparatus 10 also includes a converting means 22 for delivering a logic signal over a line 24 in response to a voltage being applied to the motor 14. A programmable data processing means 30 monitors the logic signal during only the low periods of the pulse train and produces a second logic signal in response to the first logic signal being greater than a preselected high logic level. Additionally, a switching means 26 is provided for disconnecting the motor 14 from the power supply 12 in response to receiving the second logic signal.

A safety means 17 is provided for producing a third logic signal in response to the motor 14 and the power supply 12 being connected for a time greater than a preselected period. The means 17 delivers the third signal to the switching means 26 for disconnecting the motor 14 from the power supply 12 in response to receiving the third logic signal.

The safety means 17 is an independent failsafe measure to insure that the power supply 12 is disconnected from the motor 14 in the event that the data processing means 30 fails.

FIG. 2A and 2B shows an overall motor control system 34 having the apparatus 10. The power source 12 is, for example, a battery 36 which supplies power to the motor 14 as well as, for example, to another similar motor 14'. The motor 14 has an armature 38 and a field winding 40, while the motor 14' has an armature 38' and a field winding 40'.

The controllable means 16 has a power coupling switch 20 which includes a power transistor 42 that is connectable in series with the motor 14. The power coupling switch 20, and hence the power transistor 42, is turned "on" and "off" in response to the pulse train on the line 18. A contactor 149 is provided for bypassing the controllable means 16. In the event that full power is requested, the data processor means 30 energizes a contactor coil (not shown), closes the normally open bypass contactor 149 and effectively connects the motor 14 to the power source 12. A similar controllable means 16', power coupling switch 20' and power transistor 42' are turned "on" and "off" in response to a pulse train on a similar line 18' to couple power to the motor 14'. The controllable means 16' may also be bypassed by a contactor 149'.

The switching means 26 includes a contactor coil 44 which controls a normally open line contact 44-1 that, when closed, couples line power from battery 36 to motor 14 and motor 14'. A driver circuit 46 of line contactor means 26 includes an AND gate 33 whose output on a line 31 turns "on" or "off" a driver transistor 48. The AND gate 33 has one input connected to the line 32 and another input connected to the line 35. When the input on the line 32 and the input on the line 35 are "logic 1", the output on the line 31 is "logic 1" to turn "on" transistor 48. Consequently, contactor coil 44 is energized to close line contact 44-1. When either input to the AND gate 33 is "logic 0", the output on the line 31 is "logic 0" which turns "off" the transistor 48. The contactor coil 44 is thus deenergized and the line contact 44-1 opens.

The converting means 22 includes a conductor 50 which is coupled to one side of the power transistor 42, e.g., to the emitter, as shown. The conductor 50 delivers the voltage signal present at the emitter of the power transistor 42 to a converting means 22. For example, when the power transistor 42 is turned "on" the emitter voltage signal is approximately battery voltage and when the transistor 42 is turned "off" the emitter is grounded. The converting means 22 delivers a "logic 1" via the line 24 to the data processing means 30 in response to detecting battery voltage at the emitter of the transistor 42, and a "logic 0" is delivered when the emitter is grounded. The converting means 22 can consist of any number of analog to digital converters well known in the art, the simplest of which is a voltage divider network consisting of a pair of resistors 56,58.

The digital signals delivered by the converting means 22 correspond to the pulse train produced by the data processing means 30 to control the transistor 42. To check for a short circuit of the transistor 42, the data processing means 30 polls the line 24 after producing a low pulse on the line 18. If a "logic 1" is present on the line 24, the means 30 outputs a logic signal on the line 32 to turn "off" the transistor 48 and deenergize the line contactor coil 44. In response, the line contactor 44-1 opens, and prevents any power from being supplied to the motors 14,14'. The data processing means 30 polls the line 24 after producing each "logic 0" on the line 18 and continues with normal operation as long as a "logic 0" is detected on the line 24 at the time it is polled. A similar operation occurs for the converting means 22' in conjunction with sensing a short circuit condition of the transistor 42'.

The safety means 17 for controlling the switching means 26 includes a control switch 168, such as a silicon controlled rectifier 170, with an output being taken on the line 35 via a junction 171. When the SCR 170 is "off", a voltage +V produces the "logic 1" on the line 35 via a resistor 172 and junction 171 to enable the AND gate 33. When the SCR 170 is triggered "on", the line 35 goes to a "logic 0" to disable the AND gate 33.

The means 17 includes a means 174 for controlling the triggering of the control switch 168. The controlling means 174 has an inverter 176 whose inputs 178 are connected to the line 24 via a line 142. The output of the inverter 176 is produced on a line 180 to charge a capacitor 182 via a resistor 184. A diode 186 is coupled across the resistor 184 to quickly discharge the capacitor 182 through the gate 176. A NOR gate 188 has one input connected to a line 190 which carries a "logic 1" or "logic 0" depending on the voltage of the capacitor 182. The output of the NOR gate 188 is produced on a line 192 which is connected via a junction 194 to one input of a NOR gate 196. The output of the NOR gate 196 is produced on a line 198 to charge a capacitor 200 via a diode 202 and a voltage divider 204. When the capacitor 200 is charged to a predetermined level, a "logic 1" is produced on a line 206 to trigger the SCR 170 "on".

If the capacitor 182 is charged to a voltage represented by a "logic 1" that is produced on the line 190, the NOR gate 188 will then produce a "logic 0" on the line 192. The NOR gate 196 then produces a "logic 1" on the line 198 that results in the capacitor 200 being charged to a "logic 1" which triggers the SCR 170 "on". If the capacitor 182 is not charged to the "logic 1", as can be seen from the path including the line 192, the NOR gate 196, the line 198 and the capacitor 200 that the SCR 170 will not be so triggered "on".

A relationship exists between the RC time constant of the resistor 184 and the capacitor 182 and the pulse duration of the pulses of the pulse train on line 18. These pulses are such that their maximum duration is less than the time required to charge the capacitor 182 to a "logic 1". For example, the maximum duration of a pulse is approximately 12 milliseconds, while the charge time is approximately 50 milliseconds. Therefore, in operation, if the switch 20 has not failed short-circuit, the maximum "on" time will be 12 milliseconds. During this "on" time, a "logic 0" is produced on the line 142 that is inverted by the inverter 176 onto the line 180 to charge the capacitor 182. At the end of this 12 millisecond duration, the switch 20 is turned "off", the line 142 goes to "logic 1" and the line 180 to "logic 0". The capacitor 182 rapidly discharges via the diode 186 and the inverter 176 to ground.

If, however, the switch 20 has failed short-circuit, it will remain "on" for a duration longer than 50 milliseconds. Consequently, the capacitor 182 will be charged to a "logic 1", ultimately resulting in the SCR 170 being triggered "on", as previously described.

Similarly, the means 17 includes a line 142', inverter 176', inputs 178', capacitor 182', resistor 184', diode 186' and line 190' to detect the short-circuit condition of the switch 20'. Thus, the NOR gate 188 will be enabled by the "logic 1" on the line 190' ultimately to trigger the SCR 170 "on" in the event the switch 20' fails short-circuit.

Prior to motor start-up, the line contactor coil 44 should be deenergized and the line contact 44-1 should be opened. At this time, line contact switch 62 should be opened so that means 128 is producing a "logic 0" on line 130. However, when the switch 62 is first closed at start-up, faulty signals in the means 174 can result in the SCR 170 being triggered "on" to prevent energization of the contactor coil 44 and the supply of line power via the contact 44-1. To ensure at start-up that faulty signals do not affect the energization of the contactor coil 44, the means 17 further includes means 207 for inhibiting the means 174 during this start-up condition. An inverter 208 of the means 207 has inputs connected to the line 130 via a junction 210 and an output connected over a line 212 and via a diode 214 to the junction 194 as an input of the NOR gate 196. Thus, a "logic 0" on the line 130 is inverted by the inverter 208 to a "logic 1" which is coupled via the diode 214 and the junction 194 to the NOR gate 196, forcing its output to a "logic 0". Therefore, the capacitor 200 is at "logic 0" to prevent the triggering "on" of the SCR 170. Thereafter, when the line contactor switch 62 is closed, resulting in a "logic 1" on the line 130, the inverter 208 produces a "logic 0" at the junction 194 to permit the NOR gate 196 to follow the logic signal on the line 192. Thus, the means 174 is inhibited from triggering the SCR 170 in response to a "logic 0" on the line 130 and is enabled to trigger SCR 170 in response to a "logic 1" on the line 130.

Another condition during which the SCR 170 should not be triggered "on" is the bypass mode. At this time, means 102 will be generating the bit pattern 1000 on line 104, representing maximum command speed resulting in the microprocesor 60 energizing the bypass contactor coil (150) to close the bypass contact 149 and the contact 149'. Consequently, the capacitor 182 and the capacitor 182' will be charged to a "logic 1" which otherwise would result in the SCR 170 being triggered "on". To prevent such triggering of the SCR 170 and to maintain the bypass mode, the means 17 further includes means 216 for inhibiting the means 174 in response to the motor speed command data representing maximum speed and for enabling the means 174 in response to the motor speed command data representing less than maximum speed. The means 216 includes a NOR gate 218 having one input connected to the line 104-1 and another input connected to the line 104-2. A NOR gate 220 has one input connected to the line 104-3 and another input connected to the output of an inverter 222 via a line 224, whose input is connected to the line 104-4. An AND gate 226 has one input connected to the output of the NOR gate 218 via a line 228 and another input connected over a line 230 to the output of the NOR gate 220. The output of the gate 226 is produced on a line 232 to charge a capacitor 234 via a resistor 236. A line 238, which is the other input to the NOR gate 196 is at "logic 1" or "logic 0" depending on the charged or discharged state of the capacitor 234.

In the operation of the means 216, if the system is in the bypass mode, the digital number 1000 is being generated on lines 104-4 to 104-1, respectively, and the bypass contactor 149 and the bypass contactor 149' will be closed. Therefore, the capacitor 182 and the capacitor 182' will have time, i.e., 50 milliseconds, to be charged to a "logic 1", that otherwise would cause the SCR 170 to be triggered "on". However, all the inputs to the gate 218 and the gate 220 will be "logic 0" so that the line 228 and the line 230 will be at "logic 1". Consequently, the gate 226 is enabled to charge the capacitor 234 to a "logic 1", so that the line 238 is at "logic 1", the output of the NOR gate 196 is forced to a "logic 0" and the SCR 170 is prevented from being triggered "on". Consequently, the AND gate 33 remains enabled during the bypass mode to maintain contactor coil 44 energized and line contact 44-1 closed.

For any other command speed less than full speed, the digital number on the lines 104-1 to 104-4 will be such that the AND gate 226 will be disabled, resulting in a "logic 0" on the line 238 at the other input to the gate 196. Therefore, the NOR gate 196 will gate the logic signal on the line 192 to charge or discharge the capacitor 200, as previously described.

As an added safety feature, operation of the vehicle 112 is not permitted until a seat switch 65 is closed. Closure of the seat switch 65 is initiated by the presence of an operator properly seated in the vehicle 112. Under software control, the microprocessor 60 receives a logic signal from the seat switch 65 over the line 64 and responds by producing a logic signal on the line 32 to turn "on" the transistor 48 and energize the contactor coil 44 to close the line contact 44-1. Additionally, if at any time the seat switch 65 opens, the microprocessor 60 will delay for a specified period (i.e., 1 second) and then discontinue pulsing the motors 14,14'. The entire starting procedure must then be repeated to initiate operation. If the seat switch 65 closes during the specified period, then normal operation of the control system 34 continues. Whenever the above-mentioned short circuit condition occurs, the microprocessor 60 responds to the "logic 1" on the line 24 or the line 24', irrespective of the "logic 1" on the line 64, to produce the logic signal on the line 32 that turns "off" the transistor 48 and ultimately causes the opening of the line contact 44-1.

The control system 34 includes a means 66 for controlling the direction of energization of the motors 14,14'. The means 66 includes a contactor coil 68 which controls the open-closed state of a pair of normally closed reverse contacts 68-1, 68-2 and a pair of normally open forward contacts 68-3, 68-4 which are connected across the armature 38, as shown. A driver circuit 70, having a driver transistor 72 which is biased "on" or "off" in response to a control signal on a line 74 outputted by the microprocessor 60, controls the energization and deenergization of the coil 68. A contactor coil 76 controls the open-closed state of a pair of normally open reverse contacts 76-1, 76-2 and a pair of normally closed forward contacts 76-3, 76-4 connected across the armature 38', as shown. A driver circuit 78, having a driver transistor 80 which is biased "on" or "off" in response to a control signal on a line 82 outputted by the microprocessor 60, controls the energization and deenergization of the coil 76.

The means 66 also includes a directional control switch 84 having a forward position "F", a neutral position "N", and a reverse position "R". When the switch 84 is in the neutral position "N", a capacitor 86 is charged through a resistor 88 from +V to a logic 1, so that the output of an inverter 90 on a line 92 is a logic 0, and a capacitor 94 is charged through a resistor 96 from +V, so that the output of an inverter 98 on a line 100 is logic 0.

When the directional control switch 84 is switched to forward position "F", the capacitor 86 is discharged through the resistor 88 and the switch 84 to a "logic 0". In response, the output of the inverter 90 on the line 92 is logic 1, representing the forward direction. When the directional control switch 84 is switched to the reverse position "R", the capacitor 94 is discharged through the resistor 96 and the switch 84, so that the output on the line 100 from the inverter 98 is logic 1, representing the reverse direction. The logic signals on the lines 92,100 are directional command signals.

In the operation of the directional control means 66, with the directional control switch 84 in the forward position "F", the microprocessor 60, under software control, responds to the "logic 1" on the line 92 by producing a control signal on the line 74 to turn the transistor 72 "on". A path is thus closed from +V through the coil 68 and the transistor 72 to ground, thereby energizing the coil 68 and changing the state of the contacts 68-1 through 68-4 from that shown. Assuming that the line contact 44-1 is closed, current flows from the positive side of the battery 36 through the contact 44-1, closed forward contact 68-3, armature 38, closed forward contact 68-4, field winding 40 and power transistor 42 to the negative side of the battery 36. Current also flows from the positive side of the battery 36 through the contact 44-1, transistor 42, normally closed forward contact 76-3, armature 38', normally closed forward contact 76-4, and field winding 40' to the negative side of the battery 36. Thus, the motors 14,14' are energized in the same, i.e., forward direction.

Similarly, with the directional control switch 84 switched to the reverse position "R", the microprocessor 60, under software control, responds to the "logic 1" on the line 100 by producing a control signal on the line 82 to turn the transistor 80 "on". The contactor coil 76 becomes energized and changes the state of contacts 76-1 through 76-4 from that shown, while contacts 68-1 through 68-4 remain in their normal state shown. As can be appreciated, the motors 14,14' are energized in the same, i.e., reverse direction.

Also shown in FIG. 2 is a means 102 for generating motor speed command data, specifically digital numbers, on an output line 104. For example, the data produced by the generating means 102 on the line 104 is 4-bit digital numbers ranging from 0000 to 1111. Each digital number in the range 0000–1111 represents a different motor speed command datum. For example, number 0000 represents zero speed, number 1000 represents half speed, and number 1111 represents full or maximum speed. The range of digital numbers from 0000 to 1111 in the binary coded decimal format (BCD) is used only for convenient illustration and could, of course, be any suitably coded binary representation having a number of bits consistent with the desired precision, for example, a gray code.

As one example, the generating means 102 is coupled to an accelerator pedal 106. The generating means 102 includes an accelerator box or transducer and signal conditioning circuit 110 for converting position information of the accelerator pedal 106 to any one of the digital numbers 0000–1111 on the line 104.

In operation, as the accelerator pedal 106 is released and depressed between the zero speed and full speed positions, the generating means 102 responds by producing the corresponding digital number on the line 104 in the range 0000–1111. The microprocessor 60, under software control, responds by producing corresponding pulse trains on the lines 18,18' for pulsing "on" and "off" the controllable means 16,16' to energize the motors 14,14' in the direction called for by the directional control switch 84. In the present example, since there are sixteen digital numbers or command speeds in the range 0000–1111, there are sixteen different pulse trains that can be produced by the microprocessor 60 on the lines 18,18'. These sixteen different pulse trains can be different, for example, in frequency, with higher frequency pulse trains corresponding to higher motor speeds, and/or different in pulse duration or width with wider pulses corresponding to higher motor speeds.

FIG. 3 is a flowchart of a computer program suitable for controlling the apparatus 10. Only the software routines required to implement the present invention are described herein. Sufficient detail is presented to allow one skilled in computer programming to write the required program to implement the flowchart for any common microprocessor, for example, a microprocessor produced by MOSTEK Corporation of Carrollton, Tex. and designated by the part number 3870. Upon beginning the flowchart of FIG. 4 at the block 300 labeled START, program control progresses through the following sequence:

In the block 302 the program routine begins with the line contactor 44-1 open in response to a control signal from the microprocessor 60 on the line 32. Subsequently, in the block 304, the status of the switch 65 is determined. If the switch 65 is open, indicating that the vehicle 112 is not to be operated, the program loops back to the block 302. This loop continues until the switch 65 closes, at which time the program proceeds to the block 308, and closes the line contactor 44-1 with a proper control signal from the microprocessor 60 on the line 32.

Next, in the block 309, the lines 24,24' are checked to determine if a shorted drive transistor 42,42' condition exists. If the shorted condition is detected, the program proceeds to the block 310 where the line contactor 44-1 is opened. The program then stops at the END block 311 with the apparatus 10 disabled until the short circuit condition is repaired and the program restarted at the block 300.

If the short circuit condition is not detected in the block 309, program control passes to the blocks 212-218 for operation of the motors 14,14'. In the block 312 the microprocessor 60 inputs the information received on the lines 92,100 in response to the direction switch 84 position. Next, in the block 314, control signals are passed to the transistors 72,80 to drive the direction contactor coils 68,76 for vehicle 112 operation in the direction selected by the direction switch 84.

Information received on the line 104 relating to the accelerator pedal 106 position or speed demand is next input by the microprocessor 60 in the block 316. Finally, in the block 318, the microprocessor 60 determines, either by calculation or from a look-up table stored in memory, appropriate pulse train waveforms to output on the lines 18,18' to operate the vehicle 112 at the speed demanded by the accelerator pedal 106 position. Control is then transferred back to the block 302 for the next program iteration.

FIG. 4 shows a schematized overall vehicle control system 110 for an electric vehicle 112, such as an electric fork lift truck, having a left drive wheel 114 and a right drive wheel 114'. The motor 14 will rotate the left drive wheel 114 through a shaft 116 and the motor 14' will rotate the right drive wheel 114' through a shaft 116'. The control system 34 controls the energization and deenergization of the motors 14,14' in the manner previously described and in response to the position or state of the line contactor switch 62, directional control switch 84, and accelerator pedal 106. Also shown is a steering wheel 118 and a steerable wheel 120 conventionally used in 3-wheeled vehicles, which control the steering of the vehicle 112.

INDUSTRIAL APPLICABILITY

A vehicle operator first closes the line contactor switch 62 and, if the operator is properly seated so as to close seat switch 65, the micro-processor 60 produces the control signal on the line 32 to energize the contactor coil 44 and close line contact 44-1. Then, the vehicle operator places the directional control switch 84 in the forward or reverse position, resulting in the microprocessor 60 producing the control signal on the line 74 or the line 82 to energize the coil 68 or the coil 76 for forward drive or reverse drive. Then, the vehicle operator depresses the accelerator pedal 106 to a command speed position, resulting in the microprocessor 60 producing the corresponding pulse train on the lines 18,18' to energize motors 14,14' in the forward or reverse direction at the commanded speed.

Should the transistor 42 or the transistor 42' fail short-circuit at any time, loss of speed control can occur. The means 22 or the means 22' will deliver a "logic 1" signal via the line 24 or the line 24', respectively, to the microprocessor 60. The microprocessor 60 will respond to the presence of the "logic 1" signal on the line 24 or the line 24' by producing another control signal on the line 32 to turn "off" the transistor 48 and deenergize the line contactor coil 44. In response, the line contact 44-1 is opened to decouple the supply of power to the motors 14,14' and prevent loss of speed control as well as any damage or other harmful effects to the other circuit components.

In summary, the present invention can, for example, prevent a loss of speed control by sensing short circuits in the power transistors 42,42' and immediately opening the line contact 44-1 to discontinue the power supply to the motors 14,14'. The present invention is implemented by using digital processing and integrated circuit components including the microprocessor 60, which are highly reliable, fast, durable, and cost-effective.

Other aspects, objects and advantages of the invention can be obtained from a study of the drawings, the disclosure, and the appended claims.

We claim:

1. In an apparatus (10) for controlling the speed of an electric motor (14,14') in response to receiving a command speed signal having a magnitude responsive to an accelerator pedal (106) position, said apparatus (10) including a power source (12), a processing means (30) for producing a variable frequency and variable duty cycle pulse train, and controllable means (16,16') for connecting and disconnecting said motor (14,14') to and from said power source (12) in response to said pulse train, the improvement comprising:

converting means (22,22') for producing a first logic signal in response to a voltage being applied to said motor (14,14');

said processing means (30) monitoring said first logic signal during only the low periods of said pulse train, producing a second logic signal in response to said first logic signal being greater than a preselected logically high level, and delivering said second signal;

safety means (17) for producing a third logic signal in response to the motor (14,14') and the power supply (12) being connected for a time greater than a preselected period and delivering said third signal;

switching means (26) connected to said processing means (30) and said safety means (17) for disconnecting said motor (14,14') from said power supply (12) in response to receiving one of said second and third logic signals independent of said controllable means (16,16'); and, means (216) for disabling said safety means (17) in response to receiving a maximum command speed signal.

2. An apparatus (10), as set forth in claim 1, including: means (207) for disabling said safety means (17) in response to a second operating condition.

3. An apparatus (10), as set forth in claim 2, wherein said second operating condition is start-up.

4. An apparatus (10), as set forth in claim 1, wherein said processing means (30) includes a programmable microprocessor (60).

5. An apparatus (10), set forth in claim 1, wherein said switching means (26) includes a line contactor (44-1).

6. An apparatus (10), as set forth in claim 1, wherein said converting means (22,22') includes a pair of resistors connected as a voltage divider network.

7. An apparatus (10), as set forth in claim 1, wherein said controllable means (16,16') includes a power transistor (42,42').

8. A method for protecting a motor (14,14') serially connected to a power source (12), a transistor (42), and a contactor (44-1) from a short circuit failure of the transistor (42), comprising:

controllably switching the transistor (42) "off" and "on";

converting the voltage present at the emitter of the transistor (42) to a digital signal;

monitoring said digital signal during only the "off" time of the transistor (42); and, opening the contactor (44-1) and disconnecting the motor (14,14') from the power source (12) in response to one of said digital signal being greater than a preselected logically high level and said digital signal being greater than a preselected logically high level for a preselected duration of time; and, preventing the contactor (44-1) from opening after said preselected duration of time in response to receiving a maximum command speed signal.

9. In an apparatus (10) for controlling the speed of an electric motor (14,14'), said apparatus (10) including a power source (12), means (30) for producing a variable frequency and variable duty cycle pulse train in response to the position of an accelerator pedal (106), and controllable means (16,16') for connecting and disconnecting said motor (14,14') to and from said power source (12) in response to said pulse train the improvement comprising:

converting means (22,22') for producing a first logic signal in response to a voltage being applied to said motor;

safety means (17) for producing a third logic signal in response to receiving said first logic signal for a time greater than a preselected period and delivering said third signal;

switching means (26) for receiving said third signal and independently disconnecting said rotor (14,14') from said power supply (12) in response to receiving said third logic signal; and, means (216) for disabling said safety means (17) in response to said accelerator pedal (106) being positioned at a preselected location.

10. The apparatus (10), as set forth in claim 9, wherein said preselected location of said accelerator pedal (106) is a fully actuated position.

11. The apparatus (10), as set forth in claim 9, including a means (207) for disabling said safety means (17) in response to detecting a start-up condition.

12. In an appartus (10) for controlling the speed of an electric motor (14,14'), said apparatus (10) including a power source (12), means (30) for producing a variable frequency and variable duty cycle pulse train in response to the position of an accelerator pedal (106), and controllable means (16,16') for connecting and disconnecting said motor (14,14') to and from said power source (12) in response to said pulse train, the improvement comprising:

converting means (22,22') for producing a first logic signal in response to a voltage being applied to said motor;

means (17) for producing a third logic signal in response to receiving said first logic signal for a time greater than a preselected period and delivering said third signal;

switching means (26) for independently disconnecting said motor (14,14') from said power supply (12) in response to receiving said third logic signal; and, means (216) for disabling said producing means (17) in response to said accelerator pedal (106) being positioned at a preselected location, said disabling means (216) including first and second NOR gates (218,220), each of said NOR gates having first and second inputs and outputs, said outputs being connected to first and second inputs of an AND gate 226, an output of said AND gate 226 being connected to a first input of a NOR gate 196, a second input of said NOR gate 196 being received from said producing means (17), said first and second inputs of said first and second NOR gates (218,220) receiving inputs from said accelerator pedal (106), and said second input of said second NOR gate 220 receiving said accelerator pedal (106) input through an inverter (222).

* * * * *